United States Patent [19]

Bluestein et al.

[11] Patent Number: 4,531,021
[45] Date of Patent: Jul. 23, 1985

[54] TWO LEVEL ENCRIPTING OF RF SIGNALS

[75] Inventors: Leo I. Bluestein, Rancho Bernardo; Paul E. Crandell, San Diego; David A. Drake, Escondido; Leo Jedynak, San Diego; Larry W. Simpson, Poway, all of Calif.

[73] Assignee: Oak Industries Inc., Rancho Bernardo, Calif.

[21] Appl. No.: 640,212

[22] Filed: Aug. 13, 1984

Related U.S. Application Data

[63] Continuation-in-part of Ser. No. 160,985, Jun. 19, 1980, abandoned.

[51] Int. Cl.$^3$ ............................................... H04K 1/02
[52] U.S. Cl. .............................. 178/22.08; 358/122; 358/123
[58] Field of Search ................ 176/1.5 R; 178/22.08, 178/22.09, 22.1; 375/2.1, 2.2; 358/123, 122

[56] References Cited

U.S. PATENT DOCUMENTS

| | | | |
|---|---|---|---|
| 4,115,807 | 9/1978 | Pires | 358/122 |
| 4,182,933 | 1/1980 | Rosenblum | 178/22.04 |
| 4,193,131 | 3/1980 | Lennon et al. | 178/22.09 |
| 4,203,166 | 5/1980 | Ehrsam et al. | 178/22.09 |
| 4,215,366 | 7/1980 | Davidson | 358/123 |
| 4,238,853 | 12/1980 | Ehrsam et al. | 178/22.16 |
| 4,292,650 | 9/1981 | Hendrickson | 358/122 |
| 4,323,921 | 4/1982 | Guillou | 178/22.08 |

FOREIGN PATENT DOCUMENTS 0002578 6/1979 European Pat. Off. .
1318921 5/1973 United Kingdom .

OTHER PUBLICATIONS

"Design and Specification of Cryptographic Capabilities", Carl M. Campbell, Jr., *Standard*, Feb. 1977, National Bureau of Standards, 13 pages.

"Integrating the Data Encryption Standard into Computer Networks, Sneid, *IEEE Transactions on Communications*, vol. COM-29, No. 6, Jun. 1980.

"Cryptographic Key Distribution for Terminal to Terminal Communications, Lennon et al., IBM Technical Disclosure Bulletin, vol. 22, No. 2, Jul. 1979, pp. 636-639.

*Primary Examiner*—Salvatore Cangialosi
*Attorney, Agent, or Firm*—Kinzer, Plyer, Dorn & McEachran

[57] ABSTRACT

A system for enciphering information bearing RF signals in digital form utilizes a first key common to all receivers. There are means to change the first key which means include, at the transmitter, means to send individual messages to each receiver, each message being itself enciphered in a second key which is peculiar to only one receiver or small group of receivers and which message includes a change of the first enciphering key. At each receiver there are means responsive to the correct address in a key change message which will thereafter permit the deciphering of the key change message in the key peculiar to the particular receiver or small group of receivers. The new first key is then used at the receiver to decipher subsequent information bearing messages.

2 Claims, 2 Drawing Figures

TWO LEVEL ENCRIPTING OF RF SIGNALS

This is a continuation of application Ser. No. 160,985, filed June 19, 1980, now abandoned.

SUMMARY OF THE INVENTION

The present invention relates to means for enciphering or encripting messages in digital format and which may have particular application to the communications industry. The invention will be described in connection with the enciphering and deciphering of audio signals, for example those usable in some form of subscription radio or cable format. The invention has substantially wider application and may be usable with the enciphering of video signals, for example for a subscription television broadcast or for cable television, and also has utility in the area of satellite transmissions, both of audio type signals, video signals and other forms of information, such as data which can be transmitted in digital form. The invention will be described in the context of a separate deciphering key for each receiver. However, the principles disclosed are equally applicable with a separate deciphering key for each small group of receivers. Use of the term receiver should be understood to include a small group of receivers. What is important is not to use a deciphering key common to more than a small number of individual subscribers.

A primary purpose of the invention is an enciphering system of the type described which has two levels of security, the first level providing enciphering of the information bearing signals, with the second level of security being used to encipher changes in the code or key for deciphering the information bearing messages at the first level of security.

Another purpose is an enciphering system of the type described in which the second level of security includes a separate independent enciphering key for each receiver in the system.

Another purpose is an enciphering system of the type described including a transmitter which will regularly broadcast or transmit information bearing messages in enciphered form in a particular key, which key may be changed on a periodic basis. The change of key is itself enciphered in a second key, there being an individual second key for each independent receiver in the system.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

As indicated above, the two level security enciphering concept disclosed herein has application in a wide variety of communication systems. It is usable in satellite transmission, subscription television, subscription radio, cable systems and various forms of data transmission. The following description will be particularly applicable to the enciphering of digital audio information, although quite obviously, when considering the above comments, the invention should not be so limited.

Figure 1:
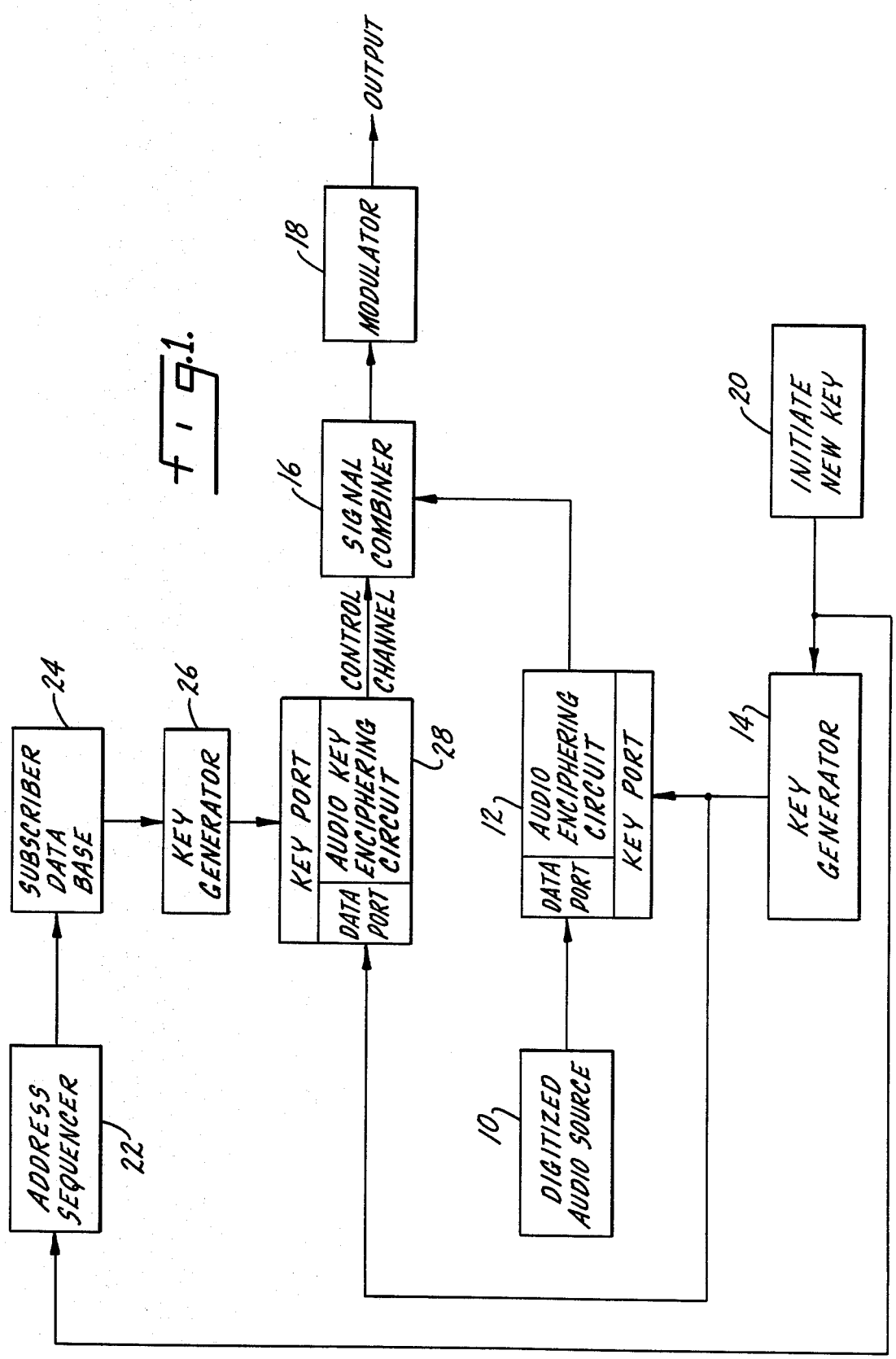
FIG. 1 is a block diagram of a transmitter usable in a system of the type described.

In FIG. 1 a source of audio information in digital form is indicated at 10 and is connected to a data enciphering circuit 12 which may, for example, utilize a Fairchild 9414 as the basic integrated circuit for enciphering the digitized audio information. The source of digital audio information is connected to the data port of enciphering circuit 12. A key generator 14 is connected to the key port of enciphering circuit 12 and will provide the key for use in enciphering the digitized audio information. Thus, the output from enciphering circuit 12 is the digitized audio information enciphered in a particular key referred to hereinafter as the first key.

The output signal from circuit 12 will pass to a signal combiner 16 and then to a modulator 18 which will transmit the information in a form appropriate for the particular medium, whether it be broadcast, cable or satellite.

As indicated above, the first key will be changed on some type of regular basis to provide a more secure system. An initiate key change circuit is indicated at 20 and will effect the formation of a new key by key generator 14. The new key will then be applied in block 12 for the enciphering of the digitized audio information. The initiate new key signal is also applied to an address sequencer 22 which will effect a search of valid subscriber addresses stored in a random access memory or subscriber data base 24. The subscriber list may not be searched in any particular order, as what is important is to insure that each subscriber whose address is still valid will be addressed any time there is a key change.

Connected to the subscriber data base 24 is a key generator 26 which may be in the form of a read only memory or ROM and which will include a separate independent key for every subscriber in the overall system. The output from key generator 26 is connected to a key enciphering circuit 28 which will receive at its data port the new key from key generator 14. In this connection, key generator 14 may be a random number generator which creates independent non-repetitive keys. The new key provided at the data port will be enciphered by the series of keys provided from key generator 26 with the result that each message will include an address and an enciphered new key with the enciphering being done in a second key which is different for each receiver. This message is the output from circuit 28 and is connected to the signal combiner for subsequent transmission as described above. Thus, every time there is to be a change in the first key for enciphering the information bearing signals, this change in key itself is enciphered in a message which includes an address and the first key enciphered in a second key with the second key being peculiar to only a single receiver.

Figure 2:
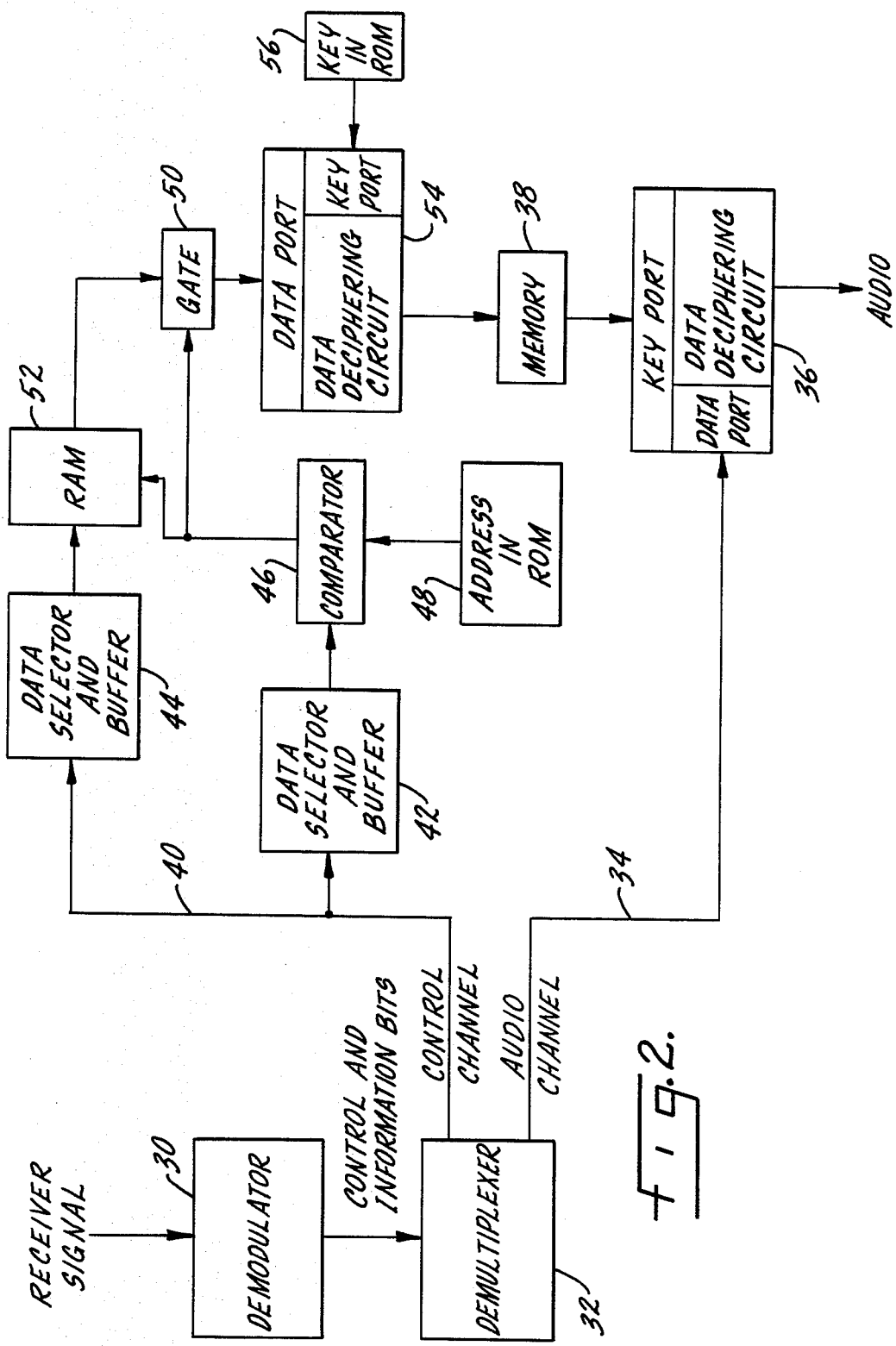
FIG. 2 is a block diagram of the receiver usable with the transmitter of FIG. 1.

Referring to the receiver shown in FIG. 2, the information bearing and key change messages described in connection with FIG. 1 are received at a demodulator 30 which provides the control and information bits to a demultiplexer 32. There are two outputs from demultiplexer 32. One output, designated the audio channel at 34, is connected to a data deciphering circuit 36 which has a data port and a key port. The enciphered information bearing signal will be provided at the data port and the output from data encipher circuit 36 will be the audio information in usable form.

A memory 38 which will contain the particular key or first key usable at a specific time is connected to the key port of data deciphering circuit 36 and thus will provide the means for deciphering the coded information bearing signals. Again, the particular integrated circuit for the data deciphering circuit may be a Fairchild 9414 suitably connected for deciphering.

The second output from the demultiplexer 32 is a control channel indicated at 40 which is connected to a first data selector and buffer amplifier circuit 42 and a second similar circuit 44. Circuit 42 will select the address portion of a control message, whereas, circuit 44 will select the message portion. Circuit 42 is connected to a comparator 46 wherein the address portion of the message is compared with a hard-wired address in a ROM 48. Assuming there is a valid comparison and thus that the message is for that particular receiver, there will be an output from comparator 46 to a gate 50 and to a random access memory (RAM) 52. RAM 52 will receive the enciphered key portion of the message from data selector 44 with this key being temporarily stored in the RAM. When an appropriate signal is received from comparator 46, the enciphered message in the RAM will be passed through gate 50 to the data port of a second data deciphering circuit 54. The key port of data deciphering circuit 54 is connected to a ROM 56 which will have a hard-wired key peculiar to a particular receiver. Thus, the enciphered new key, or first key, will be received at the data port of circuit 54 and the key for deciphering such message will be received at the key port from ROM 56. Again, circuit 54 may utilize the above-described integrated circuit or one of like kind and quality. The output from circuit 54 will be the deciphered new first key which is stored in memory 38 so that subsequent data bearing messages may be deciphered.

To summarize, the two level security system disclosed herein utilizes a first key to encipher information bearing messages in digital form. The first key will be changed on either a regular or random basis, depending upon the security safeguards necessary in the particular communications environment. When there is to be a change in the first key, the new first key is itself enciphered in a message which is peculiar to each individual receiver or to a small group of subscriber receivers as described above. Such message will include the address of a receiver and the first key enciphered in a code peculiar to that particular receiver. Thus, there will be a series of such messages, one for each receiver in the system. At the receiver the enciphered first key will be deciphered by the second key peculiar to that receiver. The deciphered first key will then be utilized in deciphering subsequent information bearing digital messages.

Whereas the preferred form of the invention has been shown and described herein, it should be realized that there may be many modifications, substitutions and alterations thereto.

We claim:

1. In a subscription television system for broadcasting enciphered digital information bearing signals, means for using a first key to encipher the digital signals, means for simultaneously broadcasting the first key enciphered digital signals to multiple subscription television subscribers, means for changing said first enciphering key applied to said digital signals, means for enciphering, in a second enciphering key, an information message as to the change in said first enciphering key, said second enciphering key being different for each of said multiple subscription television subscribers, with said information message including an address for each of said plurality of receivers, and means for transmitting said enciphered information message, separately to each of said subscription television subscribers, each such enciphered information message being enciphered in a different second key.

2. In a subscription television receiver for deciphering enciphered digital information bearing signals broadcast to multiple television subscribers, first deciphering means responsive to a subscriber common first deciphering key for deciphering said digital signals, means for changing said subscriber common first key including second deciphering means responsive to a message enciphered in a second key and which message includes a change in said first key, address means responsive to an address portion of said key change message for enabling said second deciphering means, said second deciphering means being responsive to a key peculiar to only one subscription television receiver, with each of the multiple subscription television receivers having a different second key.

* * * * *